(12) United States Patent
Kumar

(10) Patent No.: US 10,453,261 B2
(45) Date of Patent: Oct. 22, 2019

(54) METHOD AND ELECTRONIC DEVICE FOR MANAGING MOOD SIGNATURE OF A USER

(71) Applicant: Brillio LLC, Jersey City, NJ (US)

(72) Inventor: Arun Kumar Vijaya Kumar, Bangalore (IN)

(73) Assignee: BRiLLiO LLC, Jersey City, NJ (US)

( * ) Notice: Subject to any disclaimer, the term of this patent is extended or adjusted under 35 U.S.C. 154(b) by 342 days.

(21) Appl. No.: 15/494,420

(22) Filed: Apr. 21, 2017

(65) Prior Publication Data

US 2018/0164960 A1 Jun. 14, 2018

(30) Foreign Application Priority Data

Dec. 13, 2016 (IN) .............................. 201641042497

(51) Int. Cl.
*G06F 21/31* (2013.01)
*G06T 19/00* (2011.01)
*G06F 3/01* (2006.01)

(52) U.S. Cl.
CPC .......... *G06T 19/006* (2013.01); *G06F 3/011* (2013.01); *G06F 21/31* (2013.01); *G06F 2203/011* (2013.01); *G06F 2221/2103* (2013.01)

(58) Field of Classification Search
CPC .... G06F 3/011; G06F 21/31; G06F 2203/011; G06T 19/006; G10H 2240/085
See application file for complete search history.

(56) References Cited

U.S. PATENT DOCUMENTS

| | | | |
|---|---|---|---|
| 7,312,766 B1 | 12/2007 | Edwards | |
| 7,542,210 B2 | 6/2009 | Chirieleison, Sr. | |
| 7,921,067 B2* | 4/2011 | Kemp | G10H 1/0008 706/14 |
| RE45,062 E | 8/2014 | Maguire | |
| 9,160,773 B2* | 10/2015 | Bill | H04L 29/06 |
| 9,202,385 B2 | 12/2015 | Pabst | |
| 9,239,616 B1 | 1/2016 | Carrell | |
| 9,268,136 B1 | 2/2016 | Starner et al. | |
| 9,348,410 B2 | 5/2016 | LaValle et al. | |
| 2004/0237759 A1* | 12/2004 | Bill | G10H 1/40 84/668 |
| 2007/0050150 A1* | 3/2007 | Levy | A61B 5/0002 702/19 |
| 2008/0096533 A1* | 4/2008 | Manfredi | G06N 3/006 455/412.1 |
| 2008/0106489 A1 | 5/2008 | Brown et al. | |
| 2012/0017179 A1* | 1/2012 | Yoon | H04N 5/445 715/838 |
| 2015/0056577 A1 | 2/2015 | Moran et al. | |
| 2015/0258415 A1* | 9/2015 | Trivedi | H04M 1/72522 700/91 |
| 2015/0294505 A1 | 10/2015 | Atsmon | |
| 2016/0275304 A1* | 9/2016 | Jiang | G06F 21/316 |

* cited by examiner

*Primary Examiner* — James S. McClellan

(57) ABSTRACT

Embodiments herein provide a method for managing a mood signature of a user in an electronic device. The method includes obtaining a mood spectrum of the user, comprising a plurality of mood indicators representing differential mood states of the user. Further, the method includes creating a mood signature comprising a unique transcript of the mood indicators for the user, based on the mood spectrum and storing the mood signature in the electronic device.

30 Claims, 14 Drawing Sheets

Cannot determine mood signature of the user

Invalid User

Cannot determine mood signature of the user

FIG. 8A

Present mood of the user: Normal
Challenge is presented to the user to
Switch the mood of the user to "Sad"

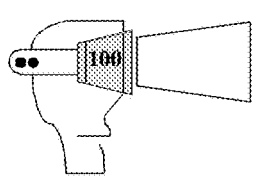
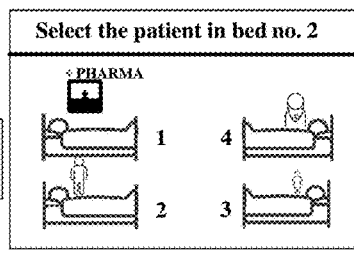

FIG. 8B

Present mood of the user: Sad
Challenge is presented to the user to
Switch the mood of the user to "Happy"

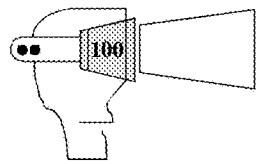
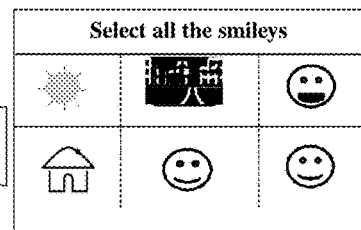

FIG. 8C

Present mood of the user: Happy
Challenge is presented to the user to
Switch the mood of the user to "Excited"

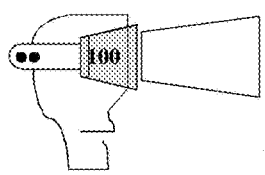
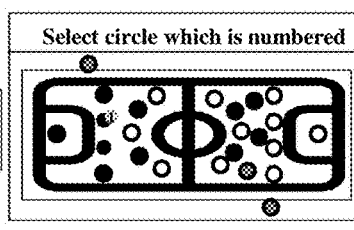

FIG. 8D

Present mood of the user: Excited
Challenge is presented to the user to
Switch the mood of the user to "Normal"

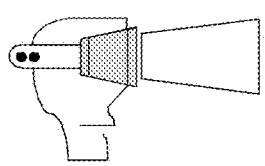
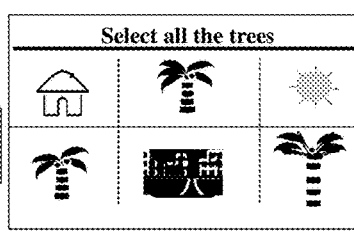
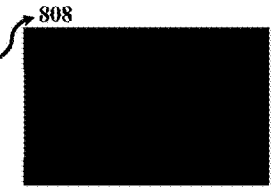

METHOD AND ELECTRONIC DEVICE FOR MANAGING MOOD SIGNATURE OF A USER

TECHNICAL FIELD

The embodiments herein generally relate to communication systems. More particularly related to a method and electronic device for managing a mood signature of a user. The present application is based on, and claims priority from an Indian Application Number 201641042497 filed on 13 Dec. 2016 the disclosure of which is hereby incorporated by reference herein.

BACKGROUND

In general, authenticating user for viewing media content might be supreme with respect to the confidentiality of the content or by any other reason to which the authentication is imposed. Also, multiple users may want to personalize or customize the media content based on their preferences whenever they view the media content provided by an electronic device.

For example, multiple users may view the media content, rendered by the electronic device, in an electronic store. The electronic store manager may wish to display certain personalized media contents to their customers different from what should be viewed by the staff members of the electronic store. There is no provision by which the electronic device can automatically switch the content based on the user switch.

SUMMARY

Accordingly, the embodiments herein provide a method for managing a mood signature of a user in an electronic device. The method includes obtaining a mood spectrum comprising a plurality of mood indicators representing differential mood states of the user. Further, the method includes creating a mood signature comprising a unique transcript of mood indicators for the user based on the mood spectrum, and storing the mood signature.

In an embodiment, the unique transcript is obtained based on a function of a time taken by the user to provide a response to a challenge presented to the user while obtaining each of the mood indicators and a time taken to switch between each of the mood states of the user.

In an embodiment, the mood spectrum comprises a time taken by the user to provide a response to a challenge presented to the user while obtaining each of the mood indicators and a time taken to switch between each of the mood states of the user.

In an embodiment, the switch between each of the mood states is determined by displaying a graphical element comprising a challenge eliciting a response from the user.

In an embodiment, the graphical element comprises a plurality of data items dynamically arranged to form the challenge based on a present mood state of the user.

In an embodiment, the mood signature representing an intrinsic response of the user to stimuli of data items presented to the user.

In an embodiment, obtaining the mood spectrum including the plurality of mood indicators includes: causing to display on a screen of the electronic device the graphical element eliciting a response to a challenge, where the graphical element comprises a plurality of data items dynamically arranged to form the challenge based on a first mood indicator, from the plurality of mood indicators, representing a present mood state of the user. Further, obtaining the mood spectrum including the plurality of mood indicators includes: determining a time taken by the user to provide the response to the challenge, detecting a second mood indicator, from the plurality of mood indicators, representing a switch to another mood state from the present mood state of the user, determining a time taken to switch to another mood state from the present mood state of the user, and obtaining the mood spectrum describing the first mood indicator and the second mood indicator along with the corresponding time taken by the user to provide the response to the challenge and the corresponding time taken to switch to the another mood state from the present mood state of the user.

In an embodiment, the switch to another mood state from the present mood state of the user is detected when the second mood indicator meets a mood switch threshold.

In an embodiment, creating the mood signature for the user based on the mood spectrum comprises: determining an average time taken by the user to provide a response for each of the challenges based on the mood spectrum, determining an average time taken to switch between each of the mood states of the user based on the mood spectrum, and creating the mood signature for the user based on the average time taken by the user to provide a response for each of the challenges and the average time taken to switch between each of the mood states of the user.

In an embodiment, the method further includes performing at least one action in the electronic device based on the mood signature of the user, where the at least one action comprises validating an identity of the user, selecting content to be displayed to the user, selecting a wallpaper for the user in the electronic device, selecting a theme for the user in the electronic device, and selecting a personalized recommendation for the user of the electronic device.

In an embodiment, validating identity of the user comprises: receiving a reference mood signature of the user, determining a degree of similarity between the reference mood signature and the stored mood signature of the user, and validating the identity of the user based on the degree of similarity between the reference mood signature and the stored mood signature of the user.

Accordingly, the embodiments herein provide yet another method for managing a mood signature of a user in an electronic device. The method includes causing to display a graphical element comprising a challenge eliciting a response from the user to trigger a switch from a present mood state of the user. Further, the method includes determining a time taken by the user to provide the response to the challenge. Further, the method includes detecting a mood indicator representing switch to another mood state from the present mood state of the user, and determining a time taken to switch to the another mood state from the present mood of the user. Furthermore, the method includes creating a mood signature comprising a unique transcript of mood indicators, where the unique transcript is obtained based on the time taken by the user to provide the response to the challenge and the time taken to switch to the another mood state from the present mood of the user, and storing the mood signature in the electronic device.

In an embodiment, the mood signature represents an intrinsic response of the user to stimuli of data items presented to the user.

In an embodiment, the switch to another mood state from the present mood state of the user is detected when the mood indicator meets a mood switch threshold.

In an embodiment, the method further comprises performing by the mood signature manager at least one action in the electronic device based on the mood signature of the user, where the at least one action comprises at least one of validating an identity of the user, selecting content to be displayed to the user, selecting a wallpaper for the user in the electronic device, selecting a theme for the user in the electronic device, and selecting a personalized recommendation for the user of the electronic device.

Accordingly, the embodiments herein provide an electronic device for managing a mood signature of a user, the electronic device comprising: a mood spectrum manager configured to obtain a mood spectrum comprising a plurality of mood indicators representing differential mood states of the user, wherein a change in each of the mood states of the user is obtained by displaying a graphical element eliciting a response to a challenge from the user. The electronic device also includes a mood signature manager configured to create a mood signature for the user based on the mood spectrum; and a mood signature database configured to store the mood signature of the user.

Accordingly, the embodiments herein provide an electronic device for managing a mood signature of a user. The electronic device includes a mood signature database, a processor and a mood signature manager, coupled to the mood signature database and the processor. The electronic device is configured to: cause to display a graphical element eliciting a response to a challenge from the user to trigger a switch in a present mood state of the user and determine a time taken by the user to provide the response to the challenge. Further, the electronic device is also configured to detect a mood indicator representing the switch in the present mood state of the user and determine the time taken to switch the present mood of the user. Furthermore, the electronic device creates the mood signature for the user based on the time taken by the user to provide the response to the challenge and the time taken to switch the current mood of the user and stores the mood signature of the user in the mood signature database.

BRIEF DESCRIPTION OF THE FIGURES

The embodiments herein will be better understood from the following detailed description with reference to the drawings, in which:

FIGS. 8A-8D is an example illustration in which the challenge is presented to a user of an electronic device based on different mood state of the user, according to an embodiment as disclosed herein;

DETAILED DESCRIPTION OF EMBODIMENTS

Figure 1:
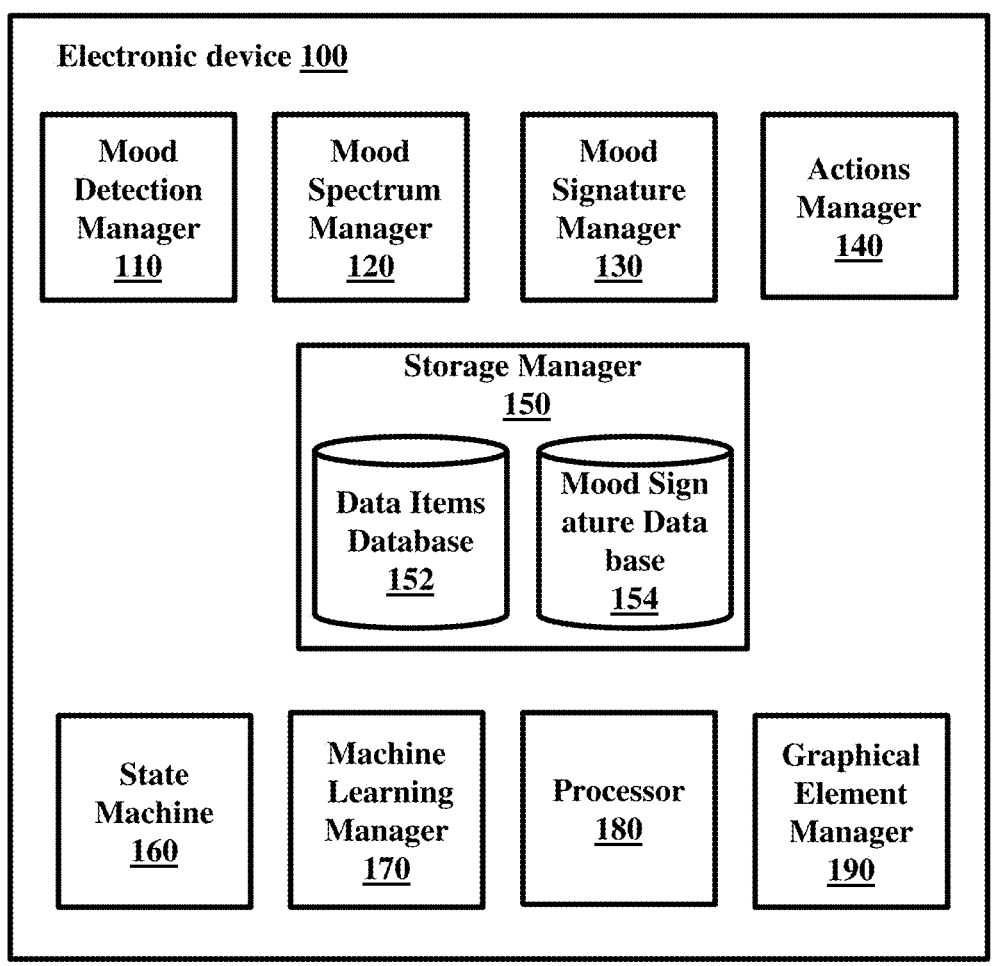
FIG. 1 is a block diagram illustrating various units of an electronic device for managing a mood signature of a user, according to an embodiment as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Prior to describing the embodiments in detail, it is useful to provide definitions for key terms used herein. Unless defined otherwise, all technical terms used herein have the same meaning as commonly understood by a person having ordinary skill in the art to which this invention belongs.

Mood Signature: May non-exclusively refers to a unique transcript of mood indicators for a user based on a mood spectrum and is configured to represent an intrinsic response of the user to stimuli of data items presented to the user. The mood signature may intuitively be determined and may be distinct to each individual user.

Mood spectrum: May non-exclusively refers to a set of one or more mood indicators representing differential mood states associated with each individual user. Further, the mood spectrum may include one or more mood indicators defined by the system (i.e., by default). The mood spectrum may include one or more mood indicators dynamically arranged based on the mood of the user.

Mood indicators: May non-exclusively refers to a model of user mood states represented using different mood states of the user such as, for e.g., happy mood, sad mood, normal mood, etc.

Mood states: The mood states, herein, may non-exclusively refers to current mood of the user that are modeled to be consistent with the mood indicator.

Challenge: May non-exclusively refers to a stimuli of data items dynamically arranged in a pattern to elicit a response from a user. The stimuli of data items dynamically arranged to be unreadable by the machines, common assistive technology tools. In an embodiment, the challenge described herein may require understanding the meaning of data items (e.g., images, a logic puzzle, trivia question, or instructions or the like). In another embodiment, the challenge described herein may require understanding the meaning of data items in context to other data items such as relation among each other, recognizing an image in context to of a logic or instruction, or the like.

Intrinsic response: May non-exclusively be referred to time taken by the user to switch current mood based on the stimuli of data items presented to the user. In an embodiment, the term intrinsic refers to an overall training data set presented to the user in the form of challenge to retrieve the mood indicators of the user.

Accordingly, the embodiments herein provide a method for managing a mood signature of a user in an electronic device. The method includes obtaining a mood spectrum of the user, comprising a plurality of mood indicators representing differential mood states of the user. Further, the method includes creating a mood signature comprising a unique transcript of the mood indicators for the user, based on the mood spectrum and storing the mood signature in the electronic device.

In conventional methods and systems, the mood data of the user is utilized to generate a mood spectrum of the user in order to select the next track occurring within the boundaries of the mood spectrum. Unlike conventional methods and systems, the proposed invention uses the mood spectrum of the user to create a mood signature of the user which may be used for validating the identity of the user, selecting a personalized recommendation for the user of the electronic device etc.

In conventional methods and systems, events such as media files are used to determine the emotion response of the user and edit the media files based on the emotion of the user. Unlike conventional methods and systems, in the proposed invention the media files are not edited to suit the mood of the user. However, the mood data of the user can be used to personalize or customize the media content for the user.

In conventional methods and systems, the mood spectrum is generated by allocating numerical values to different mood states of the user. The next mood to which the user might switch is predicted based on these numerical values. Unlike conventional methods and systems, the proposed invention uses the mood spectrum of the user to create a mood signature for the user.

In conventional methods and systems, the user manually inputs the time or duration of their various mood states of the user. Unlike conventional methods and systems, in the proposed method the electronic device automatically calculates the time taken to switch between each mood state of the user.

In conventional methods and systems, the mood data of the user is utilized for monitoring anxiety disorder of the user. Unlike conventional methods and systems, the proposed invention utilizes the mood data of the user to create a mood signature of the user. The mood signature of the user can be utilized for authentication of the user and customization and personalization of the media content to be rendered to the user.

Referring now to the drawings, and more particularly to FIGS. 1 through 10, where similar reference characters denote corresponding features consistently throughout the figures, these are shown as preferred embodiments.

FIG. 1 is a block diagram illustrating various units of an electronic device 100 for determining a mood signature of a user, according to an embodiment as disclosed herein.

In an embodiment, the electronic device 100 can be, for example, a mobile phone, a smart phone, Personal Digital Assistants (PDAs), a tablet, a wearable device, a Head Mounted display (HMD) device, Virtual reality (VR) device, Augmented Reality (AR) devices, 3D glasses, display devices, Internet of things (IoT) devices, electronic circuit, chipset, and electrical circuit (i.e., System on Chip (SoC)) configured to perform the proposed method, etc.

The electronic device 100 includes a processor 180 (for example; a hardware unit, an apparatus, a Central Processing Unit (CPU), a Graphics Processing Unit (GPU), etc.) communicatively coupled to a storage manager 150 (e.g., a volatile memory and/or a non-volatile memory); the storage manager 150 includes storage locations configured to be addressable through the processor 180, a mood detection manager 110, a mood spectrum manager 120, a mood signature manager 130, actions manager 140, a state machine 160, a machine learning manager 170, and a graphical element manager 190.

In an embodiment, for e.g., the mood detection manager 110 can be configured to receive various mood indicators from a mood detection apparatus (not shown). Each mood indicator indicates the mood state of the user. As described above, the mood indicator can be, for example, but is not limited to, a descriptor, a symbol, or a unique identifier configured to indicate the mood state of the user. For example, the mood detection manager 110 can be configured to receive a descriptor "XXOO23#" indicating a sad mood state of the user. In another example, the mood detection manager 110 can be configured to receive an emoji representing a happy state of the user. The mood detection manager 110 can be configured to include sufficient interfaces or means to interact or communicate with the mood detection apparatus to receive the mood indicators. In another embodiment, the mood detector manager 110 can use various mood detection techniques known or yet to be known in the art to detect the mood state of the user.

The mood detection manager 110 described herein may be implemented to detect the mood state of the user. Various mood detection techniques that are already known or yet to be known in the art can, without departing from the scope of the invention may be used in detecting the mood state of the user.

Once the mood detection manager 110 detects the mood state of the user (i.e., current mood state of the user) thereon, the mood detection manager 110 can be configured to send the detected mood state of the user to the mood spectrum manager 120.

In an embodiment, the mood spectrum manager 120 can be configured to receive an input (e.g., detected mood state of the user) from the mood detection manager 110, following to which the mood spectrum manager 120 obtains a mood spectrum comprising a plurality of mood indicators representing differential mood states of the user. The operations of the mood spectrum manager 120 are detailed in FIG. 2A.

The actions manager 140 can be configured to perform at least one action comprising of validating an identity of the user, selecting content to be displayed to the user, selecting a wallpaper for the user in the electronic device 100, selecting a theme for the user in the electronic device 100, and selecting a personalized recommendation for the user of the electronic device 100. For e.g., based on the stored mood signature obtained through the mood spectrum, the electronic device 100 can automatically change the wallpaper in case an automatic wallpaper changer is enabled in the electronic device. The electronic device 100 can be configured to analyze the pattern of the mood spectrum and can change the wallpaper based on the different mood state (past mood state, present mood state, and future mood state) of the user. In other e.g., if a media content (e.g., music, video, etc.) is streaming in the electronic device 100 by any of the media application associated with the electronic device 100, then based on the mood spectrum and the mood signature the electronic device 100 can be configured to automatically manage a playlist based on the mood spectrum authenticated with the mood signature.

The storage manager 150 can be associated with a data items database 152 and a mood signature database 154. The data items database 152 can include a plurality of data items representing the mood indicators. The data items database 152 can dynamically be updated based on the instructions received from the processor 180 and mood spectrum manager 120.

In another embodiment, the storage manager 150 can be remotely located and may accessible by the electronic device 100 via network interfaces.

Further, the mood signature database 154 can be configured to store a mood signature of the user. The stored mood signature may be utilized in validating an identity of the user i.e., the mood signature manager 130 can perform a degree of similarity between the stored mood signature of the user and a reference mood signature of the user. The reference mood signature may be obtained post processing (as described herein) of determining and storing the mood signature of the user.

For e.g., consider as scenario of an authentication mechanism, the mood signature manager 130 may, at first, create the mood signature of the user based on the mood spectrum of the user. Further, the mood signature database 154 can be configured to store the mood signature created therein. Thus, if the user accesses an object (i.e., kiosk machines, etc.) requiring the user authentication then the user may be presented with the challenge to create the mood spectrum of the user based on which the mood signature manager 130 can create the reference mood signature of the user. Thus, in order to increase the accuracy level of the authentication the degree of similarity may be performed between the reference mood signature and the mood signature stored therein.

In another e.g., the degree of similarity may be performed to override the negligible difference(s) occurring between the reference mood signature and the stored mood signature, thus circumventing the false alarm.

The state machine 160 can be configured to depict the entire journey that the user would go through while using the electronic device 100. Further, the state machine 160 can be configured to calibrate one or more contents of graphical element displayed on a display screen.

The machine learning manager 170, communicatively coupled to the state machine 160, can be configured to continuously monitor the current mood state of the user.

Figure 2A:
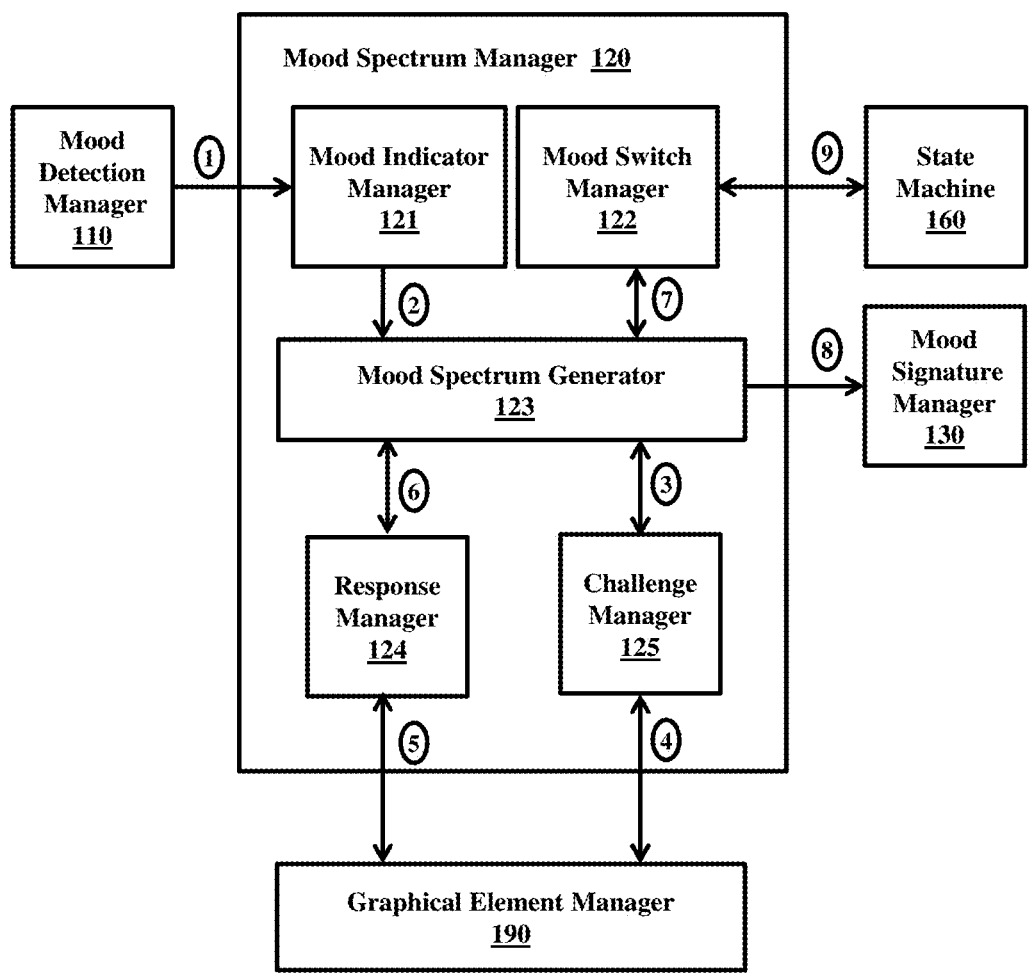
FIG. 2A is a block diagram illustrating various units of a mood spectrum manager, according to an embodiment as disclosed herein.

FIG. 2A is a block diagram illustrating various units of the mood spectrum manager 120, according to an embodiment as disclosed herein.

In conjunction with the FIG. 1, the mood spectrum manager 120 includes, for e.g., a mood indicator manager 121, a mood switch manager 122, a mood spectrum generator 123, a response manager 124 and a challenge manager 125.

In an embodiment, the mood indicator manager 121 can be configured to receive (1) the input from the mood detection manager 110. The mood indicator manager 121 may indicate (2) the current mood state of the user to the mood spectrum generator 123.

In an embodiment, for e.g., the mood spectrum generator 123 can be configured to obtain one or more mood state in order to determine a mood consistency of the user between a selection of a content (i.e., data item) and input received from the mood indicator manager 121. The mood spectrum generator 123 can generate the mood spectrum for the user, where the mood spectrum includes one or more mood indicators representing differential mood states associated with each user. Further, the mood spectrum may include one or more mood indicators defined by the system (i.e., by default). The mood spectrum may include one or more mood indicators dynamically arranged based on the mood states of the user.

The mood spectrum generator 123 can be configured to communicate (3) with the challenge manager 125. The challenge manager 125 communicates (4) with the graphical element manager 190 to present one or more graphical elements associated with the graphical element manager 190. The graphical element manager 190 can be associated with a display unit (not shown) capable of being utilized to display a screen of the electronic device 100. In an embodiment, the display unit can be, for e.g., a Cathode Ray Tube (CRT), a Liquid Crystal Display (LCD), Organic Light-Emitting Diode (OLED), a Light-emitting diode (LED), Electroluminescent Displays (ELDs), field emission display (FED), etc.) being interfaced with the mood spectrum manager 120.

The graphical element manager 190 may be associated with a plurality of data items dynamically arranged to form the challenge based on the current mood state of the user. The plurality of data items may include, for e.g., picture, image, object, etc. For e.g., when the mood indicator manager 121 indicates that the current mood state of the user is "Happy mood", the mood spectrum generator 123 may communicate with the challenge manager 125 to provide the graphical elements including the data items. Other examples are detailed in FIGS. 8A-8C.

The graphical element manager 190, can further, be configured to detect a response input e.g., tap, gesture, system defined triggered input, or any other input provided by the user to recognize the data items presented during the course of challenge. For e.g., the response manager 124 may detect input on a data item "A" from the plurality of data items presented in the graphical element when the current mood state of the user is "Happy mood. The graphical element manager 190 can be configured to communicate (5) the response input to the response manager 124.

In an embodiment, the response manager 124, communicatively coupled to the mood spectrum generator 120 and the graphical element manager 190, can be configured to calculate a time taken by the user to provide a response to the challenge presented to the user while obtaining each of the mood indicators. The operations of the response manager 124 are detailed in FIG. 2C.

The response manager 124 can further be configured to communicate (6) with the mood spectrum generator 123.

The mood detection manager 110 can be configured to continuously monitor the mood state of the user, and provide the input (i.e., mood state) to the mood indicator manager 121. For e.g., in furtherance to the challenge provided by the challenge manager 125, the mood state of the user (i.e., current mood state) may vary. For e.g., based on the challenge provided, the mood state of the user may change i.e., from "Happy mood" to "Excited mood". Thus, an input denoting the above change in the mood state is received by the mood detection manager 110. The mood detection manager 110 may, again, send (1) the input to the mood indicator manager 121 indicating the current mood state (i.e., excited mood state) of the user. The mood switch manager 122 can be configured to communicate (7) with the mood spectrum generator 123 and is configured to determine the switch in the mood state of the user.

Further, the response manager 124 can be configured to determine a time taken to switch between each of the mood states of the user.

The mood spectrum generator 123 is configured to generate the mood spectrum, thus as discussed above, the mood spectrum includes one or more mood states of the user, the time taken to response to each of the mood indicators, the time taken to switch between each of the mood indicators. Example of the mood spectrum is shown in FIG. 7 and FIGS. 9A-9C.

Further, the mood spectrum generator 123 can be configured to send (8) the generated mood spectrum to the mood signature manager 130. The operations of the mood signature manager 130 are detailed in conjunction with FIG. 3 and the FIGS. 9A-9C. The mood switch manager 122 communicates (9) with the state machine 160.

Figure 2B:
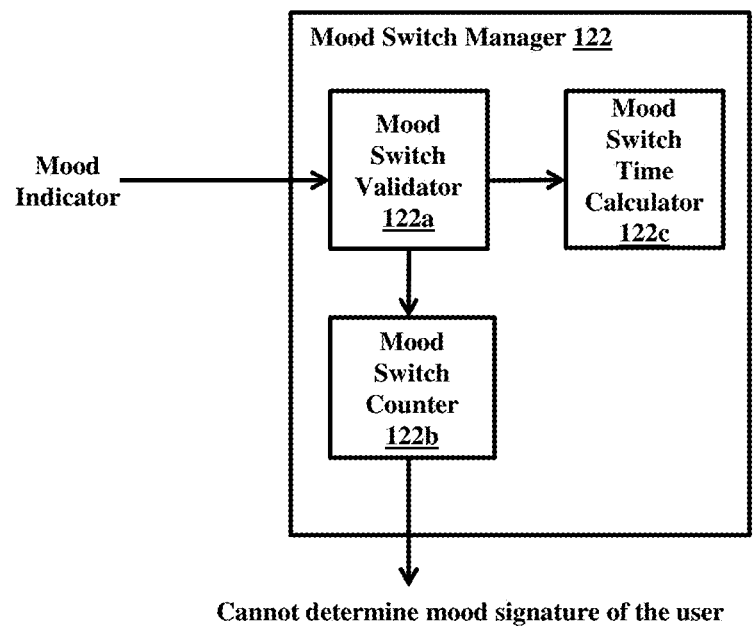
FIG. 2B is a block diagram illustrating various units of a mood switch manager, according to an embodiment as disclosed herein.

FIG. 2B is a block diagram illustrating various units of the mood switch manager 122, according to an embodiment as disclosed herein.

In conjunction with the FIG. 2A, the mood switch manager 122 can include, for e.g., a mood switch validator 122a, a mood switch counter 122b, and a mood switch time calculator 122c.

The mood switch validator 122a can be configured to receive the mood indicator from the mood spectrum generator 123. In another embodiment, the mood switch validator 122a can be configured to receive the mood indicator directly from the mood indicator manager 121. The mood switch validator 122a can be configured to validate the mood switch by determining whether threshold criteria for each of the mood state are met. For e.g., the mood switch validator 122a can be configured to determine whether the mood switch is partial or complete meeting the threshold criteria. If the mood switch is partial then the mood switch validator 122a can be configured to prevent the false switch indication. Thus, increasing the accuracy of the mood spectrum manager 120.

The mood switch counter 122b can be configured to determine number of iterations performed by the mood switch validator 122a in validating the mood switch of the user.

Unlike to the conventional systems and method, the proposed method can be utilized to detect whether the user is a human or a robot/dummy entity. For example, if the number of iterations, determined by the mood switch counter 122b, does not meet the threshold criteria (exceeds the limit) then the mood switch counter 122b can provide the notification indicating "Cannot determine mood signature of the user". The threshold criteria can be user defined/system defined.

Once the mood switch validator 122a validates the mood switch (the threshold criteria is met) then the mood switch time calculator 122c, communicatively coupled to the mood switch validator 122a, can be configured to calculate the time taken to switch (i.e., switch time) between each mood states of the user.

Figure 2C:
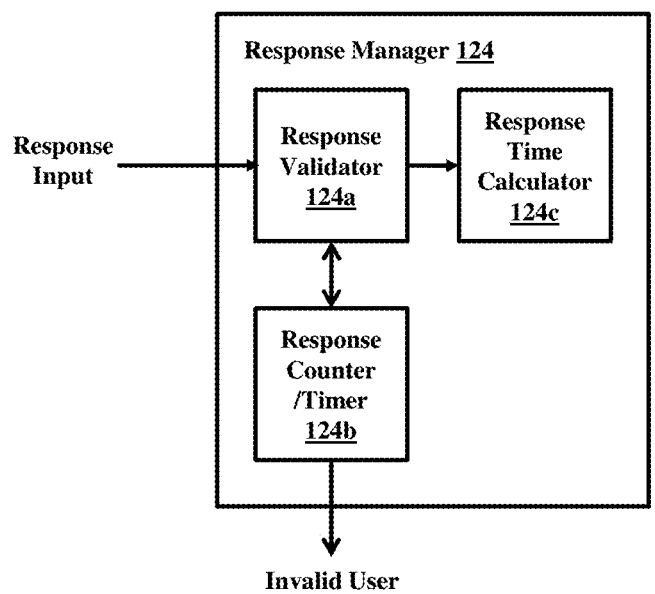
FIG. 2C is a block diagram illustrating various units of a response manager, according to an embodiment as disclosed herein.

FIG. 2C is a block diagram illustrating various units of the response manager 124, according to an embodiment as disclosed herein.

In conjunction with the FIG. 2A, the response manager 124 can include a response validator 124a, a response counter/timer 124b, and a response time calculator 124c.

The response validator 124a can be configured to receive the response input from the graphical element manager 190. Further, the response validator 124a can be configured to validate the response input i.e., whether the response input is received, whether the response input received is a valid input or an invalid input, etc. For e.g., in case of the identifying the invalid user.

The response counter/timer 124b, communicatively coupled to the response validator 124a, can be configured to determine number of iterations performed by the response validator 124a in validating the response input the user.

Unlike to the conventional systems and method, the proposed method can be utilized to detect whether the user is a valid user. For example, if the number of iterations, determined by the response validator 124a, does not meet the threshold criteria (exceeds the limit) then the response counter/timer 124b can provide the notification indicating "Invalid user". The threshold criteria can be user defined/system defined.

Once the response validator 124a validates the response input (i.e., threshold criteria is met) then the response time calculator, communicatively coupled to the response validator 124a, can be configured to calculate the time (i.e., response time) taken by the user while obtaining each of the mood indicators. For e.g., in responding to the each of the mood indicators provided to the user.

Figure 2D:
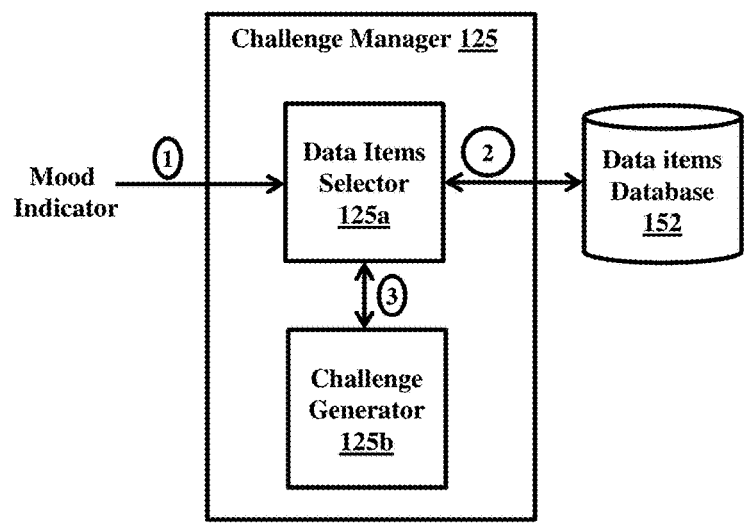
FIG. 2D is a block diagram illustrating various units of a challenge manager, according to an embodiment as disclosed herein.

FIG. 2D is a block diagram illustrating various units of the challenge manager 125, according to an embodiment as disclosed herein.

In conjunction with the FIG. 2A, the challenge manager 125 can include, for e.g., data items selector 125a and a challenge generator 125b. The challenge manager 125 can be communicatively coupled to the graphical element manager 190. In an embodiment, the data items selector 125a can be configured to receive (1) the mood indicator from the mood spectrum generator 123. Further, the data items selector 125a can be configured to select the plurality of data items to be associated with the graphical element (provided by the graphical element manager 190). The graphical element is displayed on the screen of the display unit. The data items selector 125a can be configured to communicate (2) with the data items database 152.

The challenge generator 125b can communicate (3) with the data items selector 125a to generate the challenge comprising the graphical elements eliciting the response from the user.

Figure 3:
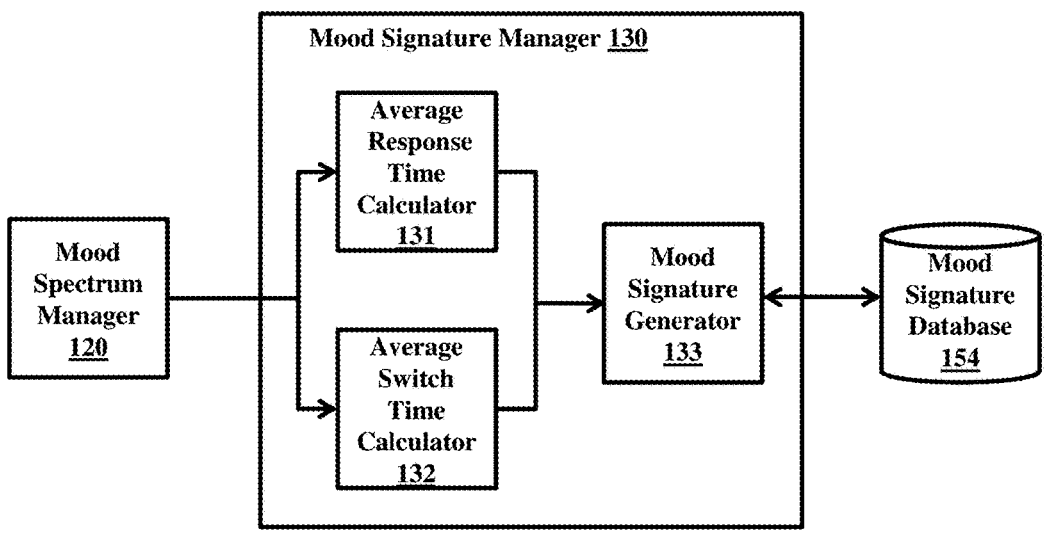
FIG. 3 is a block diagram illustrating various units of a mood signature manager configured to generate the mood signature based on a mood spectrum, according to an embodiment as disclosed herein.

FIG. 3 is a block diagram illustrating various units of the mood signature manager 130 configured to generate the mood signature based on the mood spectrum, according to an embodiment as disclosed herein.

Referring to the FIG. 3, the mood signature manager 130 can include an average response time calculator 131, an average switch time calculator 132 and a mood signature generator 133.

The average response time calculator 131 can be configured to receive the time taken by the user provide the response to the challenge presented to the user while obtaining each of the mood indicators from the mood spectrum. Further, the average response time calculator 131 can be configured to obtain an average of the time taken by the user to provide the response. For e.g., if X1 is a time taken by the user to provide the response for the data items presented in the graphical element-1 and X2 is a time taken by the user to provide the response for the data items presented in the graphical element-2, then the average response time calculator 131 can obtain an average of X1 and X2 i.e., ((X1+X2)/2).

The average switch time calculator 132 can be configured to receive the time taken to switch between each of the mood states of the user from the mood spectrum. Further, the average switch time calculator 132 can be configured to obtain an average of the time taken by the user to switch between each of the mood states. For e.g., if Y1 is a time taken by the user to switch from normal mood state to the sad mood state and Y2 is a time taken by the user to switch from sad mood state to the happy mood state, then the average switch time calculator 132 can obtain an average of Y1 and Y2 i.e., ((Y1+Y2)/2).

The mood signature manager 133 can be configured to receive the output resultant of the average response time calculator 131 and the average switch time calculator 132 and further configured to generate the mood signature comprising the unique transcript. The unique transcript is obtained based on the function (the output resultant) of the average response time calculator 131 and the function of average switch time calculator 132. Thus, the mood signature may include the unique transcript of mood indicators.

The mood signature generated, above, can be stored in the mood signature database 154. In another embodiment, the mood signature generated, above, can be the reference mood signature and thereafter the mood signature manager 130 can perform the look up to identity if there is any stored mood signature in the mood signature database 154. In yet another embodiment, mood signature manager 130 can be configured to perform the degree of similarity between the reference mood signature and the stored mood signature.

FIG. 4 is a block diagram illustrating various units of the mood signature manager 130 configured to generate the mood signature, according to an embodiment as disclosed herein.

Figure 4A:
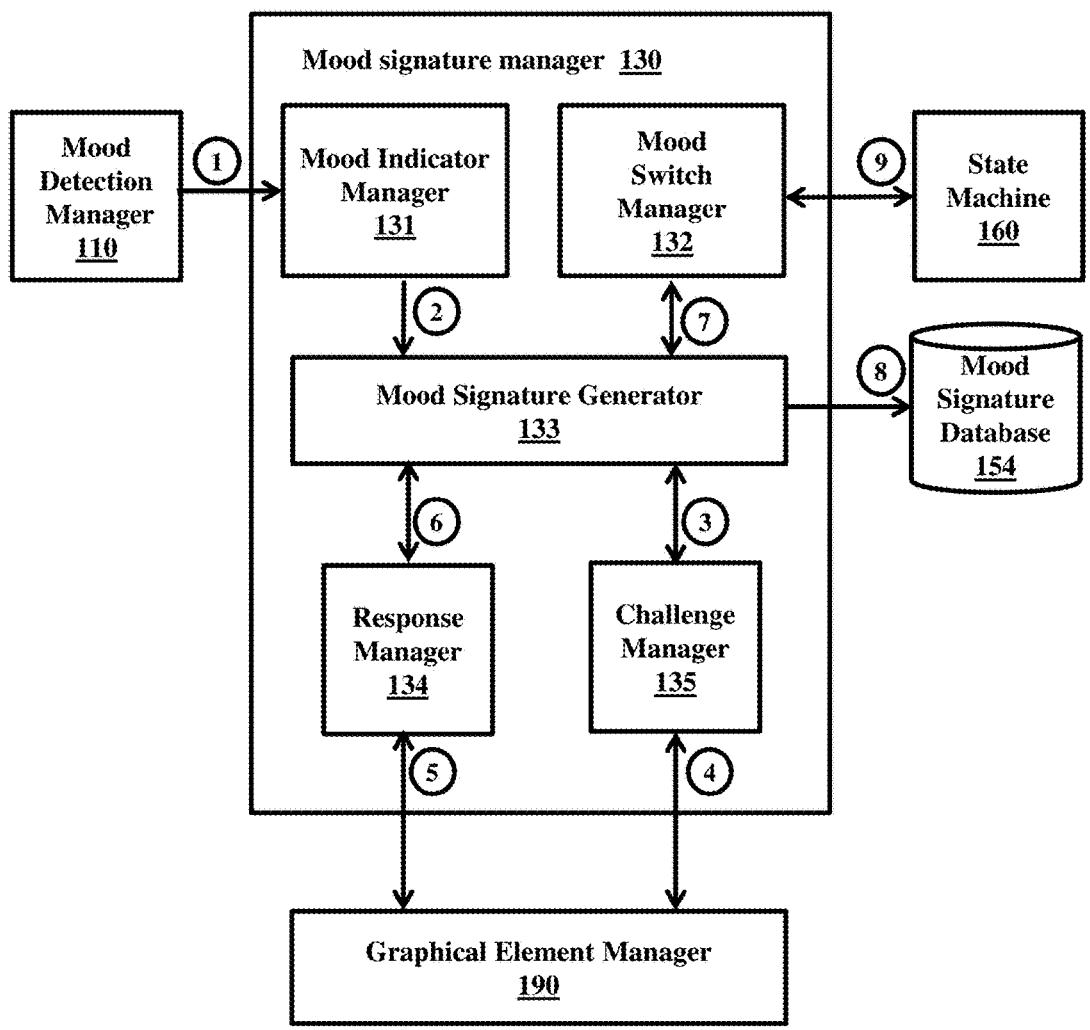
FIG. 4A is a block diagram illustrating various units of a mood signature manager configured to generate a mood signature, according to an embodiment as disclosed herein.

Referring to the FIG. 4A, the mood signature manager 130 includes, for e.g., a mood indicator manager 131, a mood switch manager 132, a mood signature generator 133, a response manager 134 and a challenge manager 135.

In an embodiment, the mood indicator manager 131 can be configured to receive (1) the input from the mood detection manager 110. The mood indicator manager 131 indicates (2) the current mood state of the user to the mood signature generator 133.

The mood signature generator 133 can be configured to communicate (3) with the challenge manager 135. The challenge manager 135 communicates (4) with the graphical element manager 190 to present one or more graphical elements associated with the graphical element manager 190. The graphical element manager 190 can be associated with the display unit (not shown) capable of being utilized to display the screen of the electronic device 100. In an embodiment, the display unit can be, for e.g., a Cathode Ray Tube (CRT), a Liquid Crystal Display (LCD), Organic Light-Emitting Diode (OLED), a Light-emitting diode (LED), Electroluminescent Displays (ELDs), field emission display (FED), etc.) being interfaced with the mood signature generator 133.

The graphical element manager 190, can, further, be configured to detect the response input e.g., tap, gesture, system defined triggered input, or any other input provided by the user to recognize the data items presented during the course of challenge. For e.g., the response manager 136 can detect input on a data item ""''A'''' from the plurality of data items presented in the graphical element when the current mood state of the user is ""''Happy mood''''. The graphical element manager 190 can be configured to communicate (5) the response input to the response manager 136.

In an embodiment, the response manager 134, communicatively (6) coupled to the mood signature generator 133 and the graphical element manager 190, can be configured to calculate a time taken by the user to provide the response to the challenge presented to the user while obtaining each of the mood indicators.

The response manager 134, can further, be configured to communicate (6) with the signature generator 133.

The mood detection manager 110 can be configured to continuously monitor the mood state of the user, and provide the input (i.e., mood state) to the mood indicator manager 131. For e.g., in furtherance to the challenge provided by the challenge manager 135, the mood state of the user (i.e., current mood state) may vary. For e.g., based challenge provided, the mood state of the user may change i.e., from ""''Happy mood''''" to ""''excited mood''''. Thus, an input denoting the above change in the mood state is received by the mood detection manager 110. The mood detection manager 110 may, again, send (1) the input to the mood indicator manager 131 indicating the current mood state (i.e., excited mood state) of the user. The mood switch manager 132 can be configured to communicate (7) with the mood spectrum generator 133 and is configured to determine the switch in the mood state of the user.

Further, the response manager 135 can be configured to determine a time taken to switch between each of the mood states of the user.

The mood signature generator 133 can be configured to create the mood signature comprising the unique transcript of mood indicators for the user, where the unique transcript is obtained based on the time taken by the user to provide the response to the challenge and the time taken to switch to the another mood state from the present mood of the user.

Further, the mood signature generator 133 can be configured to send (8) the generated mood signature to the mood signature database 154. The mood switch manager 132 may communicate (9) with the state machine 160.

Figure 4B:
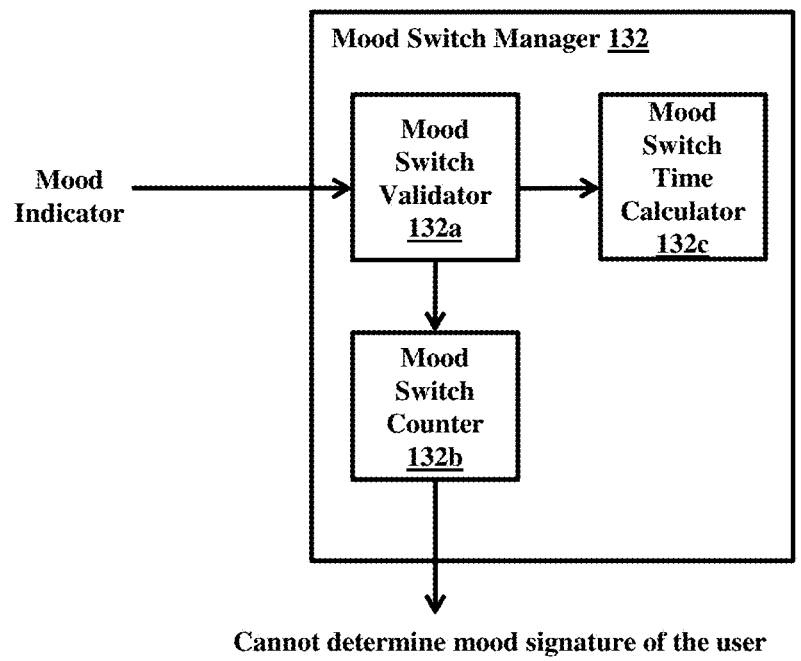
FIG. 4B is a block diagram illustrating various units of a mood switch manager, according to an embodiment as disclosed herein.

FIG. 4B is a block diagram illustrating various units of the mood switch manager 132, according to an embodiment as disclosed herein.

In an embodiment, the mood switch manager 132 can include, for e.g., a mood switch validator 132*a*, a mood switch counter 132*b*, and a mood switch time calculator 132*c*. The mood switch validator 132*a*, the mood switch counter 132*b*, and the mood switch time calculator 132*c* described herein are same or substantially similar to the mood switch validator 122*a*, the mood switch counter 122*b*, and the mood switch time calculator 122*c*, respectively. Further, the operations performed by the mood switch validator 132*a*, the mood switch counter 132*b*, and the mood switch time calculator 132*c* are same or substantially similar to the operations performed by the mood switch validator 122*a*, the mood switch counter 122*b*, and the mood switch time calculator 122*c*, respectively. According, the details of the mood switch validator 132*a*, the mood switch counter 132*b*, and the mood switch time calculator 132*c* are not described for the sake of brevity/conciseness.

Figure 4C:
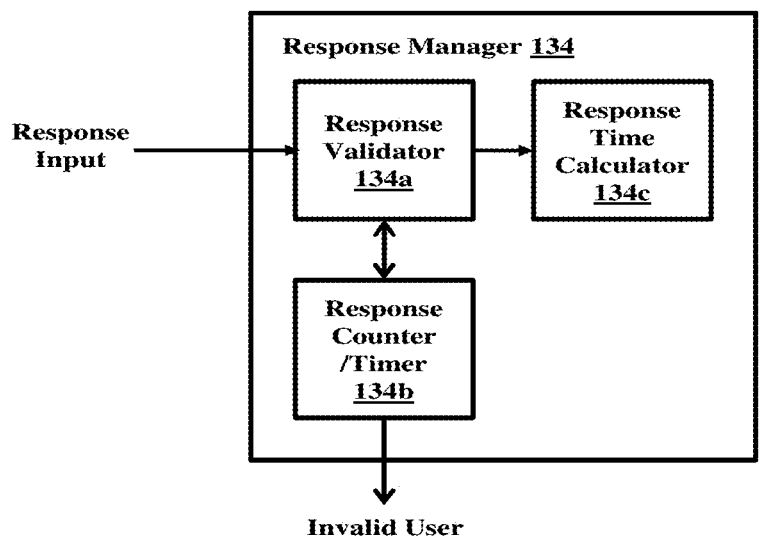
FIG. 4C is a block diagram illustrating various units of a response manager, according to an embodiment as disclosed herein.

FIG. 4C is a block diagram illustrating various units of the response manager 134, according to an embodiment as disclosed herein.

In an embodiment, the response manager 134 can include a response validator 134*a*, a response counter/timer 134*b*, and a response time calculator 134*c*. The response validator 134*a*, the response counter/timer 134*b*, and the response time calculator 134*c* described herein are same or substantially similar to the response validator 124*a*, the response counter/timer 124*b*, and the response time calculator 124*c*, respectively. Further, the operations performed by the response validator 134*a*, the response counter/timer 134*b*, and the response time calculator 134*c* are same or substantially similar to the response validator 124*a*, the response counter/timer 124*b*, and the response time calculator 124*c*, respectively. According, the details of the response validator 134*a*, the response counter/timer 134*b*, and the response time calculator 134*c* are not described for the sake of brevity/conciseness.

Figure 4D:
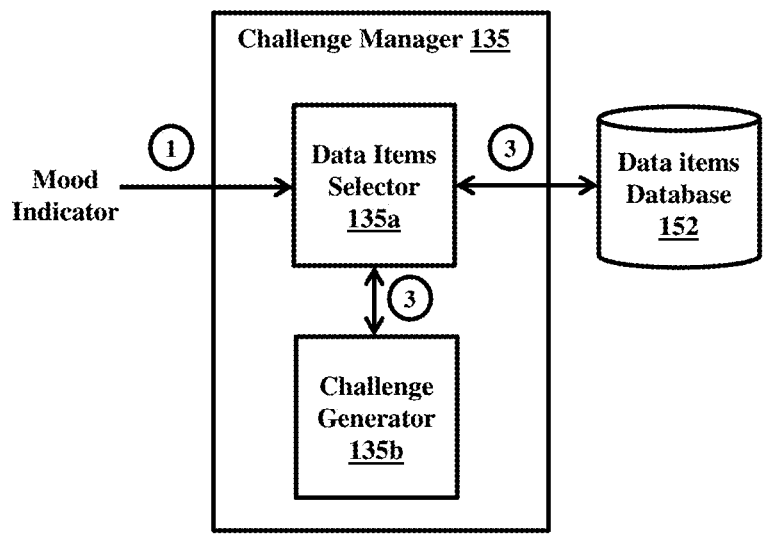
FIG. 4D is a block diagram illustrating various units of a challenge manager, according to an embodiment as disclosed herein.

FIG. 4D is a block diagram illustrating various units of the challenge manager 135, according to an embodiment as disclosed herein.

In an embodiment, the challenge manager 135 can include, for e.g., data items selector 135*a* and a challenge generator 135*b*. The challenge manager 135 can be communicatively coupled to the graphical element manager 190. The data items selector 135*a* and the challenge generator 135*b* described herein are same or substantially similar to the data items selector 125*a* and the challenge generator 125*b*, respectively. Further, the operations performed by the data items selector 135*a* and the challenge generator 135*b* are same or substantially similar to the data items selector 125*a* and the challenge generator 125*b*. Accordingly, the details of the data items selector 135*a* and the challenge generator 135*b* are not described for the sake of brevity/conciseness.

Figure 5A:
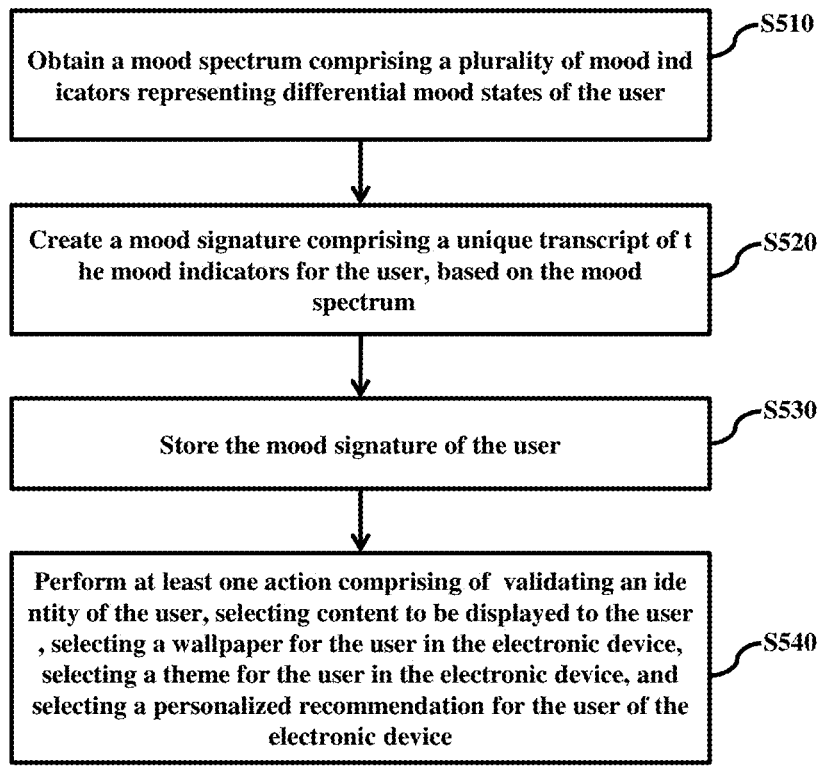
FIG. 5A is a flow chart illustrating the method for managing a mood signature of a user in an electronic device, according to an embodiment as disclosed herein.

FIG. 5A is a flow chart illustrating the method for managing the mood signature of the user in the electronic device 100, according to an embodiment as disclosed herein.

Referring to the FIG. 5A, at step S510, the electronic device 100 obtains the mood spectrum comprising the plurality of mood indicators representing differential mood states of the user. For example, in the electronic device 100 as illustrated in the FIG. 1, the mood spectrum manager 120 can be configured to obtain (as detailed in FIG. 5B) the mood spectrum comprising the plurality of mood indicators representing differential mood states of the user.

At step S520, the electronic device 100 creates the mood signature comprising the unique transcript of the mood indicators for the user, based on the mood spectrum. For example, in the electronic device 100 as illustrated in the FIG. 1, the mood signature manager 130 can be configured to create (as detailed in FIG. 5C) the mood signature comprising the unique transcript of the mood indicators for the user, based on the mood spectrum.

At step S530, the electronic device 100 stores the mood signature of the user. For example, in the electronic device 100 as illustrated in the FIG. 1, the mood signature database 154 can be configured to store the mood signature of the user.

At step S540, the electronic device 100 performs at least one action comprising of validating the identity of the user, selecting content to be displayed to the user, selecting the wallpaper for the user in the electronic device 100, selecting the theme for the user in the electronic device, and selecting a personalized recommendation for the user of the electronic device. For example, in the electronic device 100 as illustrated in the FIG. 1, the actions manager S540 can be configured to perform at least one action comprising of validating the identity of the user, selecting content to be displayed to the user, selecting the wallpaper for the user in the electronic device 100, selecting the theme for the user in the electronic device 100, and selecting a personalized recommendation for the user of the electronic device 100.

Figure 5B:
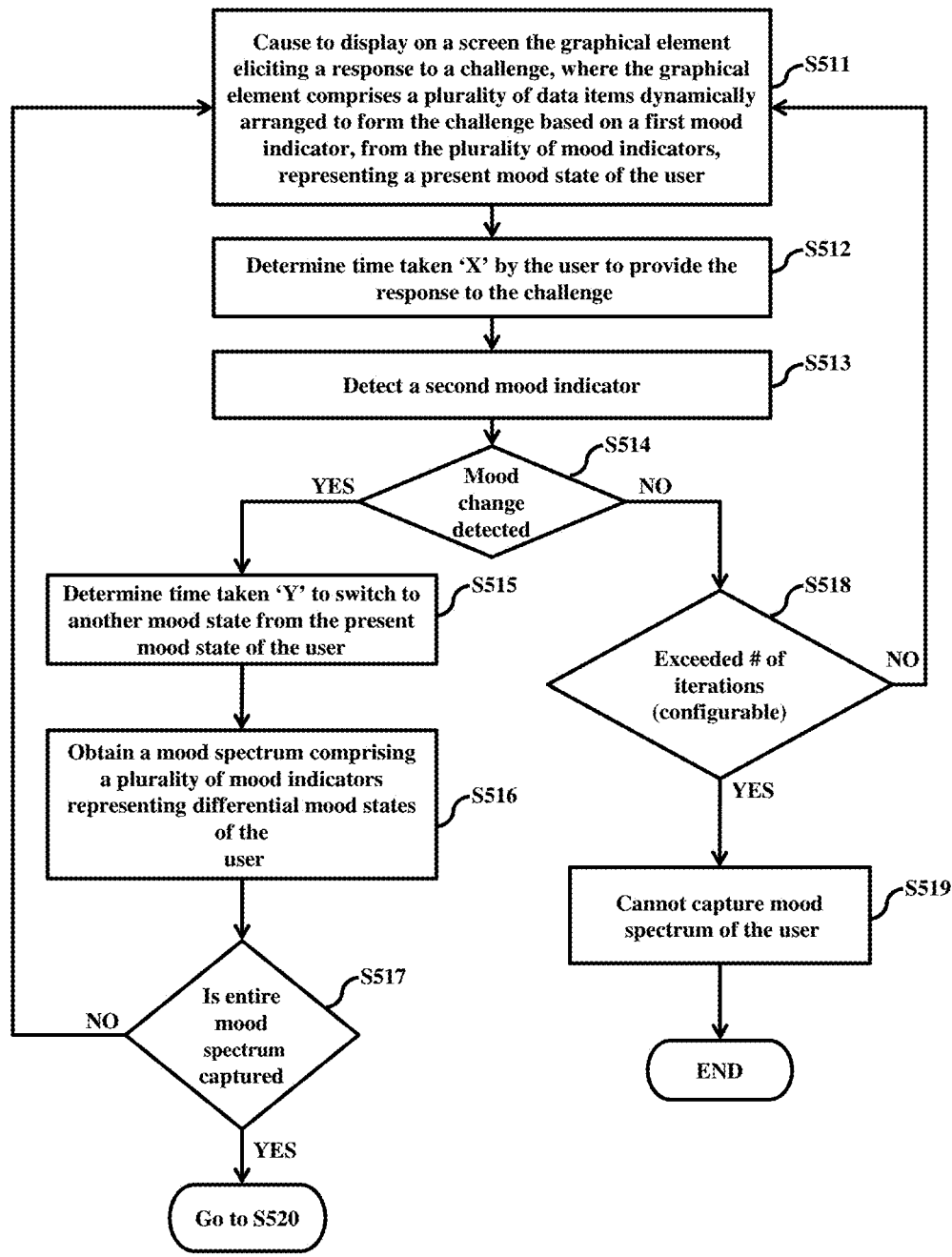
FIG. 5B is a flow chart illustrating the method for obtaining a mood spectrum of a user, according to an embodiment as disclosed herein.

FIG. 5B is a flow chart illustrating the method for obtaining the mood spectrum of the user, according to an embodiment as disclosed herein.

In conjunction to FIG. 5A, referring to the FIG. 5B, at step S511, the electronic device 100 causes to display on the screen the graphical element eliciting the response to the challenge, where the graphical element comprises the plurality of data items dynamically arranged to form the challenge based on the first mood indicator, from the plurality of mood indicators, representing the present mood state of the user. For example, in the electronic device 100 as illustrated in the FIG. 1, the graphical element manager 190 can display on the screen the graphical element eliciting the response to the challenge, where the graphical element comprises the plurality of data items dynamically arranged to form the challenge based on the first mood indicator, from the plurality of mood indicators, representing the present mood state of the user.

At step S512, the electronic device 100 determines the time taken 'X' by the user to provide the response to the challenge. For example, in the electronic device 100 as illustrated in the FIG. 1, the mood spectrum manager 120 can be configured to determine the time taken 'X' by the user to provide the response to the challenge.

At step S513, the electronic device 100 detects the second mood indicator. For example, in the electronic device 100 as illustrated in the FIG. 1, the mood spectrum manager 120 can be configured to detect the second mood indicator.

At step S514, the electronic device 100 detects whether there is a change in the present mood state of the user. If yes, then, at step S515, the electronic device 100 determines the time taken 'Y' to switch to another mood state from the present mood state of the user.

Based on the switch, the electronic device 100, at step S516, obtains the mood spectrum comprising the plurality of mood indicators representing differential mood states of the user. For example, in the electronic device 100 as illustrated in the FIG. 1, the mood spectrum manager 120 can be configured to obtain the mood spectrum comprising the plurality of mood indicators representing differential mood states of the user.

At step S517, the electronic device 100 determines whether the entire mood spectrum for the user has been captured. If yes, then at step S517, electronic device 100 can create the mood signature of the user. If, no, then the electronic device 100 can perform the operations of the step S511.

If, at step S514, the electronic device 100 does not detect the change in the present mood state of the user, then, at step S518, the electronic device 100 determines whether the mood switch counter 135b has exceeded "#" the number of iterations (e.g., pre-defined number of iterations). If yes, at step S519, the mood switch counter 135b may notify the processor 180 communicatively coupled to the mood spectrum manager 120) that the mood spectrum of the user cannot be created. If no, then the electronic device 100 can perform the operations of the step S511.

Figure 5C:
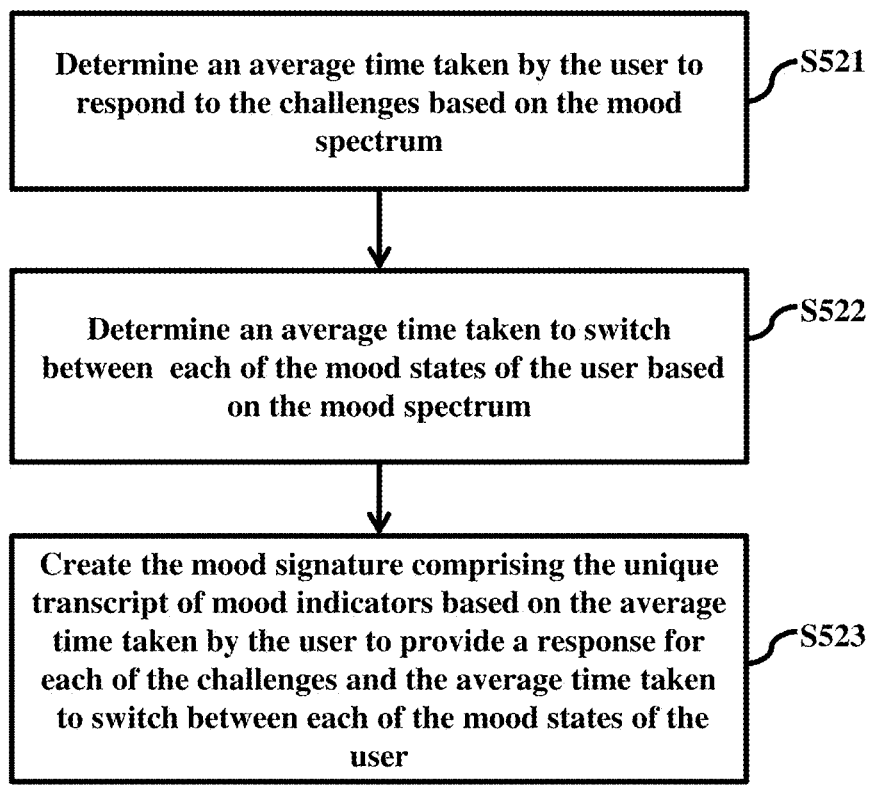
FIG. 5C is a flow chart illustrating a method for creating a mood signature of a user, according to an embodiment as disclosed herein.

FIG. 5C is a flow chart illustrating a method for creating the mood signature of the user, according to an embodiment as disclosed herein.

In conjunction to FIG. 5A, referring to the FIG. 5C, at step S521, the electronic device 100, determines the average time taken by the user to respond to the challenges based on the mood spectrum. For example, in the electronic device 100 as illustrated in the FIG. 1, the mood signature Manager 130 can be configured to determine the average time taken by the user to respond to the challenges based on the mood spectrum.

At step S522, the electronic device 100 determines the average time taken to switch between each of the mood states of the user based on the mood spectrum. For example, in the electronic device 100 as illustrated in the FIG. 1, the mood signature manager 130 can be configured to determine the average time taken to switch between each of the mood states of the user based on the mood spectrum.

At step S523, the electronic device 100 creates the mood signature comprising the unique transcript of mood indicators based on the average time taken by the user to provide the response for each of the challenges and the average time taken to switch between each of the mood states of the user. For example, in the electronic device 100 as illustrated in the FIG. 1, the mood signature manager 130 can be configured to create the mood signature comprising the unique transcript of mood indicators based on the average time taken by the user to provide the response for each of the challenges and the average time taken to switch between each of the mood states of the user.

Figure 6:
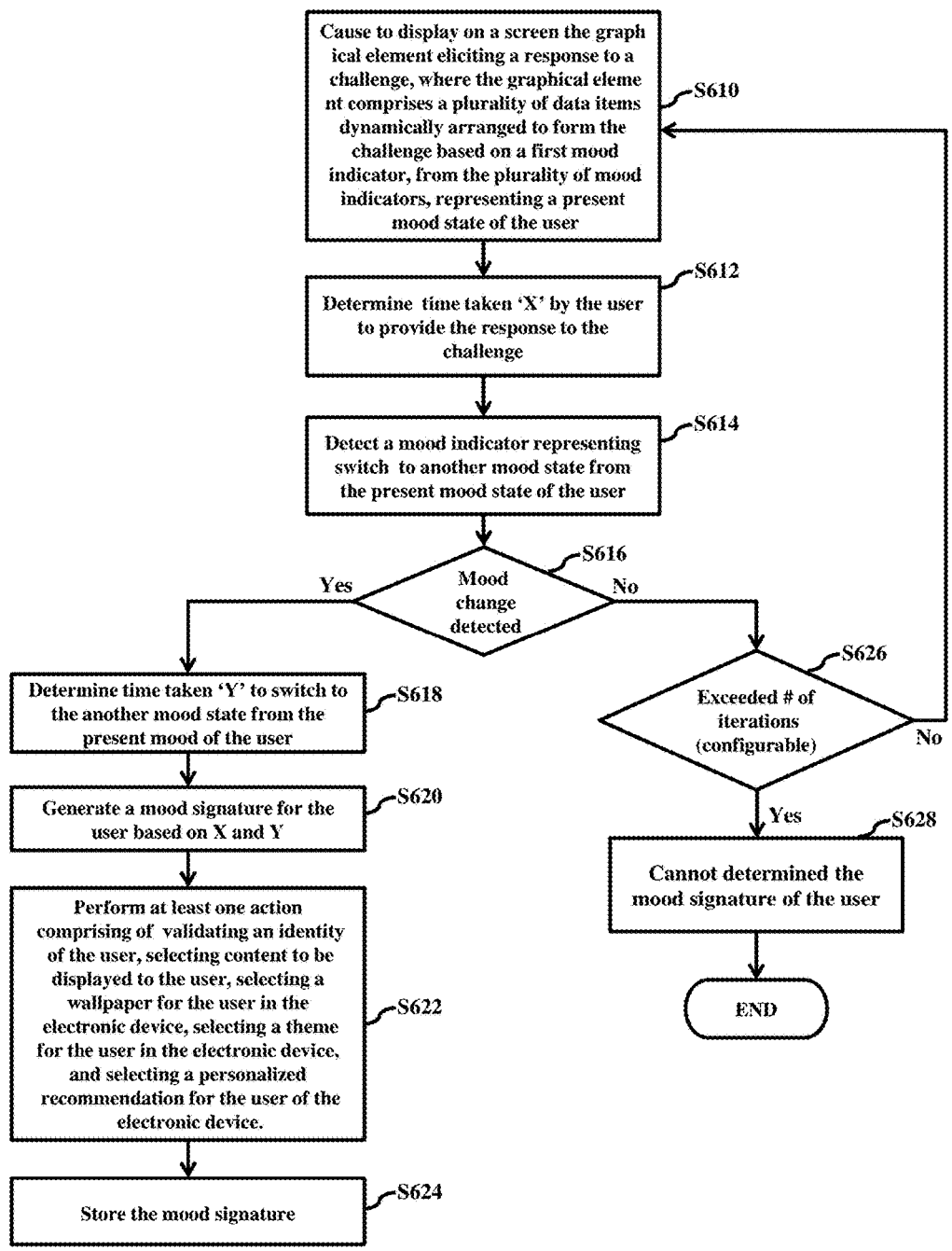
FIG. 6 is a flow chart illustrating another method for managing a mood signature of a user in the electronic device, according to an embodiment as disclosed herein.

FIG. 6 is a flow chart illustrating another method for method for managing the mood signature of the user in the electronic device 100, according to an embodiment as disclosed herein.

Referring to the FIG. 6, at step S610, the electronic device 100 causes to display on the screen the graphical element eliciting the response to the challenge, where the graphical element comprises the plurality of data items dynamically arranged to form the challenge based on the first mood indicator, from the plurality of mood indicators, representing the present mood state of the user. For example, in the electronic device 100 as illustrated in the FIG. 1, the graphical element manager 190 can display on the screen the graphical element eliciting the response to the challenge, where the graphical element comprises the plurality of data items dynamically arranged to form the challenge based on the first mood indicator, from the plurality of mood indicators, representing the present mood state of the user.

At step S612, the electronic device 100 determines the time taken 'X' by the user to provide the response to the challenge. For example, in the electronic device 100 as illustrated in the FIG. 1, the mood spectrum manager 120 can be configured to determine the time taken 'X' by the user to provide the response to the challenge.

At step S614, the electronic device 100 detects the second mood indicator. For example, in the electronic device 100 as illustrated in the FIG. 1, the mood spectrum manager 120 can be configured to detect the second mood indicator.

At step S616, the electronic device 100 detects whether there is a change in the present mood state of the user. If yes, the, at step S618, the electronic device 100 determines the time taken 'Y' to switch to another mood state from the present mood state of the user.

At step S620, the electronic device 100 generates the mood signature for the user based on X and Y. For example, in the electronic device 100 as illustrated in the FIG. 1, the mood signature manager 130 can be configured to generate the mood signature for the user based on X and Y.

At step S622, the electronic device 100 performs at least one action comprising of validating an identity of the user, selecting content to be displayed to the user, selecting wallpaper for the user in the electronic device 100, selecting a theme for the user in the electronic device 100, and selecting a personalized recommendation for the user of the electronic device 100. For example, in the electronic device 100 as illustrated in the FIG. 1, the actions manager 140 can be configured to perform at least one action comprising of validating the identity of the user, selecting content to be displayed to the user, selecting wallpaper for the user in the electronic device 100, selecting the theme for the user in the electronic device 100, and selecting the personalized recommendation for the user of the electronic device 100.

At step S624, the electronic device 100 stores the mood signature in the electronic device. For example, in the electronic device 100 as illustrated in the FIG. 1, the mood signature database 154 can be configured to store the mood signature in the electronic device 100.

If, at step S616, the electronic device 100 does not detect the change in the present mood state of the user, then, at step S626, the electronic device 100 determines whether the mood switch counter 135b has exceeded "#" the iterations (e.g., pre-defined). If yes, at step S628, the mood switch counter 135b can notify the processor 180 (communicatively coupled to the mood spectrum manager 120) that the mood spectrum of the user cannot be created. If no, then the electronic device 100 can perform the operations of the step S610.

Figure 7:
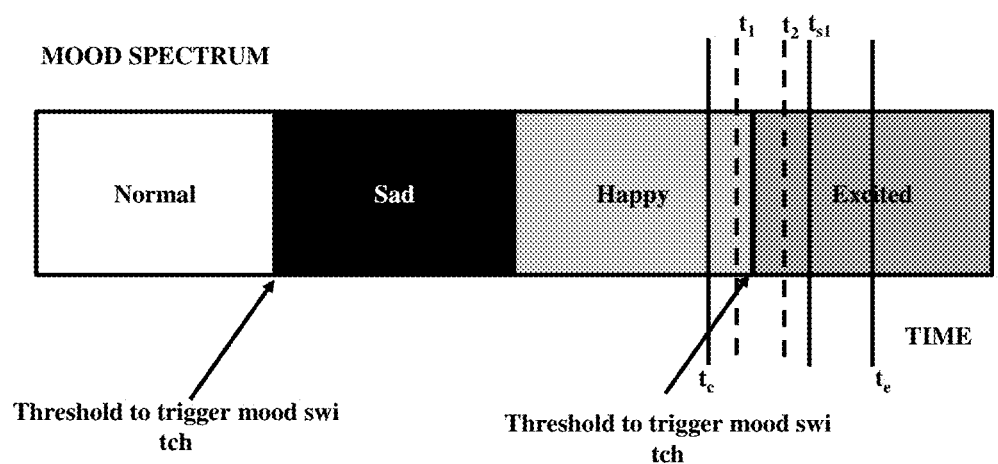
FIG. 7 is an example illustration of the mood spectrum in which a mood switch threshold between each mood state of the user is defined, according to an embodiment as disclosed herein.

FIG. 7 is an example illustration of the mood spectrum in which a mood switch threshold to switch between each mood state of the user is defined, according to an embodiment as disclosed herein.

Referring to the FIG. 7, the mood spectrum includes the plurality of mood indicators representing differential mood states of the user. The mood states such as for e.g., "Normal mood", "Sad mood", "Happy mood", "Excited mood", etc. In order to avoid false tripping/triggering of the mood switch, the mood spectrum manager 130 can be configured to defined the mood switch threshold (system defined, user defined) between each mood state of the user.

For e.g., if the current mood of the user "$t_c$" is closer to Excited mood state than Happy mood state. Then, the mood switch manager 122 can be configured to trigger the mood switch, the time to switch from happy mood state to excited mood state will be much smaller compared to the time to switch from Happy to Normal mood state. The progression towards the happy mood state to excited mood state could be non-linear progression. Hence, capturing the response time and the switching time, gives the complete mood signature of the user. Thereby, it's imperative to capture the response time and the switching time for the user within each mood state of the user and during each mood switch respectively.

Where;

$t_c$—Time taken to identify data items in the current mood
$t_1$—Time taken to identify images in the $1^{st}$ iteration where a mood switch trigger is initiated
$t_2$—Time taken to identify images in the $2^{nd}$ iteration where a mood switch trigger is initiated
$t_{s1}$—Time taken to switch from normal to excited state
te—Time taken to identify images in the excited state FIGS. 8A-8D is an example illustration in which the challenge is presented to the user of the electronic device 100 based on the different mood state, according to an embodiment as disclosed herein.

For example, an identity system (with an authentication access approval), in general, needs to be authenticated by a user of the identity system to prove his/her identity or for an access approval. Thus, for this purpose (of proving the identity) the mood signature of the user can be utilized (as a default identity approval step/or an alternative of any password, secret code, etc.) to aid the user in providing the access approval.

For e.g., consider an identity system of an interactive Kiosk in which managing the security is very critical to limit non-malicious users by hacking a password using a keypad pattern, etc. Unlike to the conventional systems and methods, the proposed method allows the user of the electronic device 100 to set the mood signature including the unique transcript of mood indicators for the user based on the mood spectrum.

Consider a user accessing the interactive Kiosk (associated to the electronic device 100 by any means known (e.g., paired, connected, etc.) or yet to be known), the electronic device 100 can provide the challenge to the user based on the present mood state of the user. The challenge comprising one or more graphical elements including the plurality of data items dynamically arranged to form the challenge based on the present mood state of the user. For e.g., referring to the FIG. 8A, if the present mood state of the user is "Normal" then the challenge "to select the patient in bed 2" is presented to the user to switch the mood of the user to "Sad". The graphical element 802 includes plurality of data items (1, 2, 3 and 4). Thus, the electronic device 100 obtains the time taken by the user to response (identify) the patient in bed 2 and time taken to switch from normal mood state to the sad mood state.

Referring to FIG. 8B, the electronic device 100 can provide a challenge "select all the smileys" from a graphical element 804. Thus, the electronic device 100 obtains the time taken by the user to response (identify) the smiley emoji form the plurality of emojis and time taken to switch from sad mood state to happy mood state.

Referring to FIG. 8C, the electronic device 100 provides a challenge "select circle which is numbered" from a graphical element 806. Thus, the electronic device 100 obtains the time taken by the user to response (identify) the circle which is numbered and time taken to switch from the happy mood state to excited mood state Similarly, referring to the FIG. 8D, the electronic device 100 provides a challenge "select all trees" from a graphical element 808. Thus, the electronic device 100 obtains the time taken by the user to response (identify) the trees and time taken to switch from the excited mood state to normal mood state.

Thus, from the above challenges provided to the user, the electronic device 100 obtains the time to response and time to switch between each mood state in each of the challenge. Further, the mood spectrum manager 120 can be configured to create the mood spectrum (as described above) of the user and the mood signature including the unique transcript of mood indicators for the user based on the mood spectrum. The mood signature is thus stored in the mood signature database 154.

In another embodiment, the mood signature can be stored in a storage of the interactive kiosk.

Thus, as discussed above, the interactive kiosk can be accessed based on the mood signature of the user.

Unlike to the conventional system and methods, where if the user forgets the password for the identity system and is unable to access the services therein, the "Forgot your password link" may appear to aid the user for accessing the identity system. Thus, when the user clicks the password link, a Kiosk page may be displayed including the security related questions for authenticating the user identity. Instead of providing the security related questions to authenticate the user identity, (or in addition to the security related questions in order to increase the security) the proposed method may therefore allow the electronic device 100 to provide the challenge, as described herein, based on which the mood spectrum of the user can be obtained. Further, the electronic device 100 can create the reference mood signature of the user based on the obtained mood spectrum. Thus, the reference mood signature is mapped with the stored mood signature of the user based on degree of similarity, if the degree of similarity between the reference mood signature and the stored mood signature meets threshold criteria then the user can be able to create a new password for accessing the identity system and the services present therein.

Figure 9A:
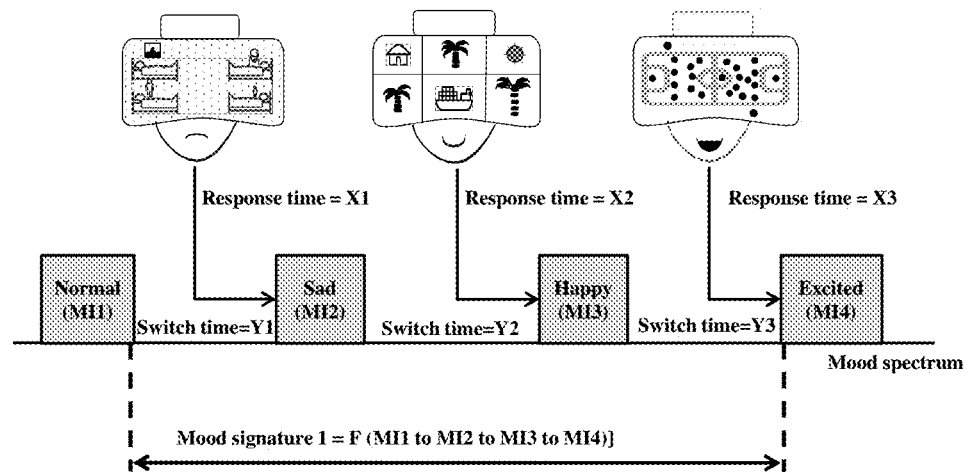
FIGS. 9A-9C is an example illustration in which a mood signature of a user based on a mood spectrum is created, according to an embodiment as disclosed herein.
Figure 9B:
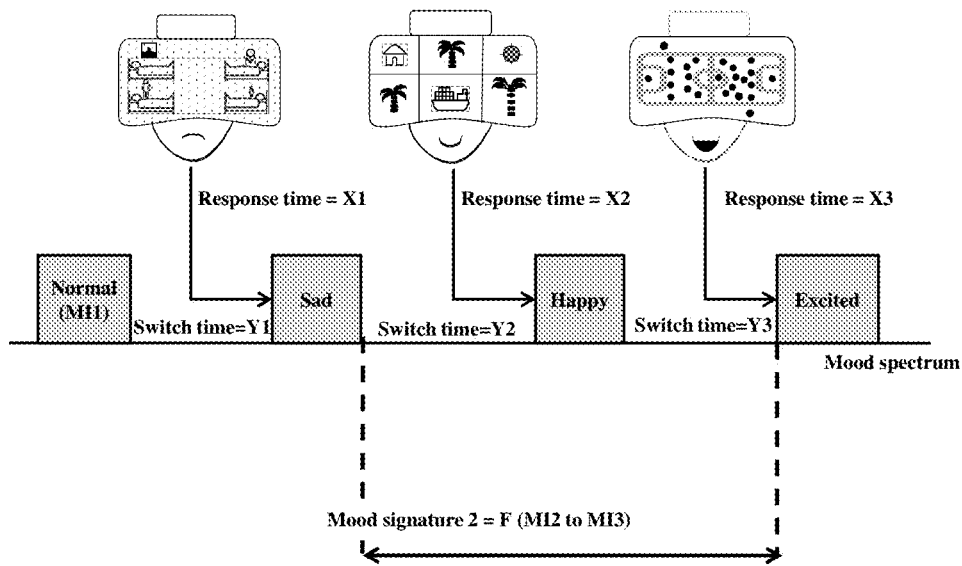

FIGS. 9A-9B is an example illustration in which the mood signature of the user based on the mood spectrum is created, according to an embodiment as disclosed herein.

In conjunction with FIGS. 1, 3 and 8A, referring to the FIG. 9A the mood spectrum includes a normal mood state (MI1), a sad mood state (MI2), a happy mood state (MI3) and an excited mood state (MI4). Further, the mood spectrum may include a response time (X1), a response time (X2), a response time (X3), a switch time (Y1), a switch time (Y2) and a switch time (Y3).

Thus, the average response time calculator 131 can be configured to compute the average of the response time ((X1+X2+X3)/3) and the average switch time calculator 132 can be configured to compute the average of the switch time ((Y1+Y2+Y3)/3). Further, the mood signature generator 133 can be configured to generate the Mood Signature (MS) comprising the unique transcript of Mood Indicators (MI1 to MI2 to MI3 to MI4) based on the function (F) i.e., resultant output, of the average response time calculator 131 and the resultant output of the average switch time calculator 132.

Thus, the MS1=F(MI1 to MI2 to MI3 to MI4).

Similarly, referring to the FIG. 9B, the average response time calculator 131 can be configured to compute the average of the response time ((X2+X3)/2) and the average switch time calculator 132 can be configured to compute the average of the switch time ((Y2+Y3)/2). Further, the mood signature generator 133 can be configured to generate the mood signature (MS) comprising the unique transcript of mood indicators (MI2 to MI3) based on the function (F) i.e., resultant output, of the average response time calculator 131 and the resultant output of the average switch time calculator 132.

Mood signature (MS2)=F(MI2 to MI3).

Figure 9C:
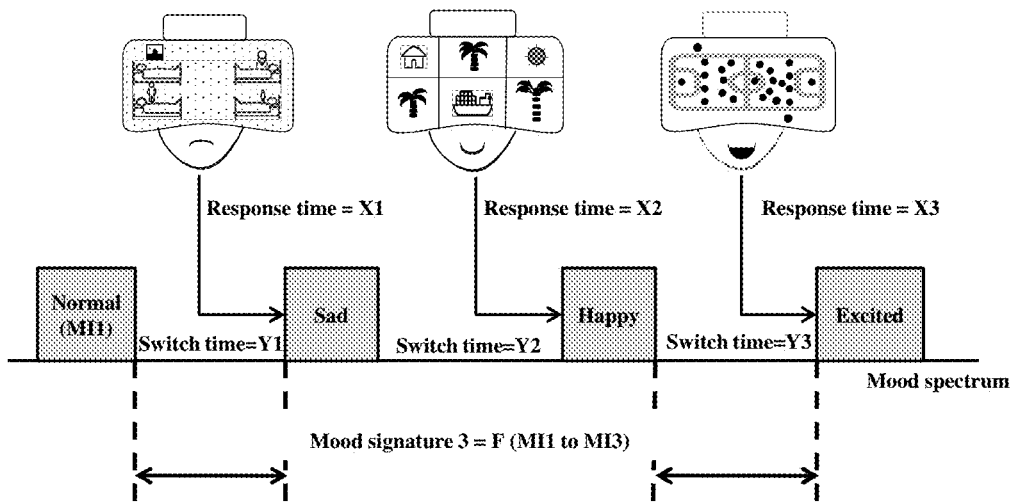

Similarly, referring to the FIG. 9C, the average response time calculator 131 can be configured to compute the average of the response time ((X1+X3)/2) and the average switch time calculator 132 can be configured to compute the average of the switch time ((Y1+Y3)/2). Further, the mood signature generator 133 can be configured to generate the mood signature (MS) comprising the unique transcript of mood indicators (MI1 to MI3) based on the function (F) i.e., resultant output, of the average response time calculator 131 and the resultant output of the average switch time calculator 132.

Mood signature (MS3)=F(MI1 to MI3).

Thus, as seen above, different mood signature based on the mood state of the different user can be created.

Unlike to the conventional method and systems, the proposed mood signature can be leveraged to intrinsically determine the user without any physiological considerations or parameters. This mood signature can be stored in the electronic device 100. While determining the mood signature of the user, the machine learning manager 170 can be configured to parallelly learn the response pattern of the user, which is unique and is highly unlikely that the response pattern of users across in the electronic device 100 would be uniform. Even if it is, to have the switching time between each mood state of the user, the probability of the false triggering of the mood switch is very low. The premise is that within reasonable constraints the response pattern of the user may have the high degree of similarity, thereby; the reference mood signature of the user may be similar to the stored mood signature of the same user. Thus, the electronic device 100 can perform a lookup in the mood signature database 154 to determine if the mood signature with high degree of similarity exists. With this as a premise, the mood signature stored in the mood signature database 154 can be useful in validating the user, using the electronic device 100. If the degree of similarity is low, then the user authentication fails.

Figure 10:
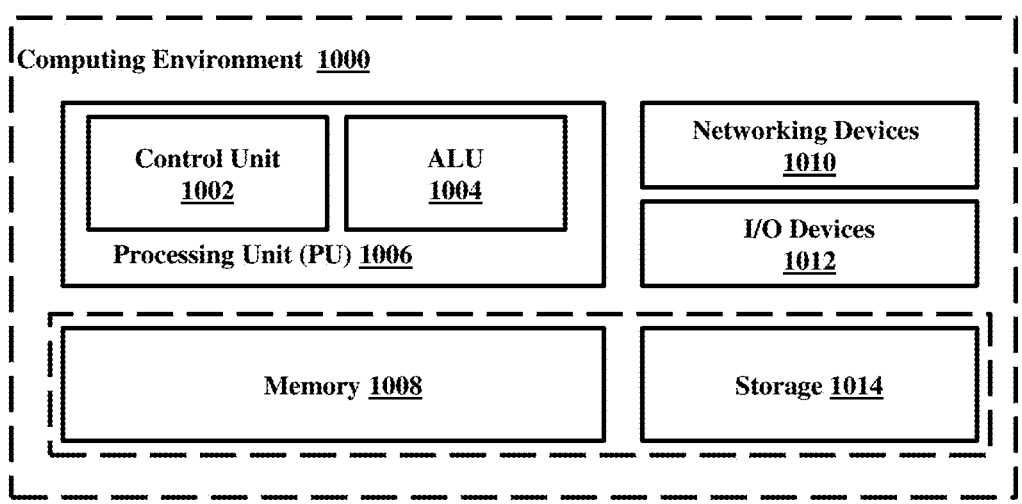
FIG. 10 illustrates a computing environment implementing a method for managing the mood signature of a user in an electronic device, according to an embodiment as disclosed herein.

FIG. 10 illustrates a computing environment 1000 implementing a method and system for managing the mood signature in the electronic device 100, according to an embodiment as disclosed herein. As depicted in the FIG. 10, the computing environment 1000 comprises at least one processing unit 1006 that is equipped with a control unit 1002 and an Arithmetic Logic Unit (ALU) 1004, a memory 1008, a storage unit 1014, plurality of networking devices 1010 and a plurality Input output (I/O) devices 1012. The processing unit 1006 is responsible for processing the instructions of the technique. The processing unit 1006 receives commands from the control unit 1002 in order to perform its processing. Further, any logical and arithmetic operations involved in the execution of the instructions are computed with the help of the ALU 1206.

The overall computing environment 1000 can be composed of multiple homogeneous and/or heterogeneous cores, multiple CPUs of different kinds, special media and other accelerators. The processing unit 1006 is responsible for processing the instructions of the technique. Further, the plurality of processing units 1006 can be located on a single chip or over multiple chips.

The technique comprising of instructions and codes required for the implementation are stored in either the memory 1008 or the storage 1014 or both. At the time of execution, the instructions can be fetched from the corresponding memory 1008 or the storage 1014, and executed by the processing unit 1006.

In case of any hardware implementations various networking devices 1010 or external I/O devices 1012 can be connected to the computing environment to support the implementation through the networking unit 1010 and external I/O devices 1012.

The embodiments disclosed herein can be implemented through at least one software program running on at least one hardware device and performing network management functions to control the elements. The elements shown in the FIGS. 1 through 10 include blocks which can be at least one of a hardware device, or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for managing a mood signature of a user in an electronic device, the method comprising:
obtaining, by a mood spectrum manager, a mood spectrum comprising a plurality of mood indicators representing differential mood states of the user;
creating, by a mood signature manager, a mood signature comprising a unique transcript of mood indicators for the user based on the mood spectrum, wherein creating the mood signature for the user based on the mood spectrum comprises:
determining an average time taken by the user to provide a response for each of the challenges based on the mood spectrum,
determining an average time taken to switch between each of the mood states of the user based on the mood spectrum, and
creating the mood signature comprising the unique transcript of mood indicators based on the average time taken by the user to provide a response for each of the challenges and the average time taken to switch between each of the mood states of the user; and storing, by the mood signature manager, the mood signature in the electronic device.

2. The method of claim 1, wherein the unique transcript is obtained based on a function of a time taken by the user to provide a response to a challenge presented to the user while obtaining each of the mood indicators and a time taken to switch between each of the mood states of the user.

3. The method of claim 1, wherein the mood spectrum comprises a time taken by the user to provide a response to a challenge presented to the user while obtaining each of the mood indicators and a time taken to switch between each of the mood states of the user.

4. The method of claim 3, wherein the switch between each of the mood states is determined by displaying a graphical element comprising a challenge eliciting a response from the user.

5. The method of claim 4, wherein the graphical element comprises a plurality of data items dynamically arranged to form the challenge based on a present mood state of the user.

6. The method of claim 1, wherein the mood signature representing an intrinsic response of the user to a stimuli of data items presented to the user, wherein the electronic device is one of virtual reality (VR) device, an Augmented Reality (AR) device, a mixed reality device, an IoT device.

7. The method of claim 1, wherein obtaining the mood spectrum comprising the plurality of mood indicators comprises:

causing to display on a screen of the electronic device the graphical element eliciting a response to a challenge, wherein the graphical element comprises a plurality of data items dynamically arranged to form the challenge based on a first mood indicator, from the plurality of mood indicators, representing a present mood state of the user;

determining a time taken by the user to provide the response to the challenge;

detecting a second mood indicator, from the plurality of mood indicators, representing a switch to another mood state from the present mood state of the user;

determining a time taken to switch to another mood state from the present mood state of the user; and obtaining the mood spectrum describing the first mood indicator and the second mood indicator along with the corresponding time taken by the user to provide the response to the challenge and the corresponding time taken to switch to the another mood state from the present mood state of the user.

8. The method of claim 7, wherein the switch to another mood state from the present mood state of the user is detected when the second mood indicator meets a mood switch threshold.

9. The method of claim 1, wherein the method further comprises performing by the mood signature manager at least one action in the electronic device based on the mood signature of the user, wherein the at least one action comprises validating an identity of the user, selecting content to be displayed to the user, selecting a wallpaper for the user in the electronic device, selecting a theme for the user in the electronic device, and selecting a personalized recommendation for the user of the electronic device.

10. The method of claim 9, wherein validating identity of the user comprises:

receiving a reference mood signature of the user;

determining a degree of similarity between the reference mood signature and the stored mood signature of the user; and validating the identity of the user based on the degree of similarity between the reference mood signature and the stored mood signature of the user.

11. A method for managing a mood signature of a user in the electronic device, the method comprising:

causing to display a graphical element comprising a challenge eliciting a response from the user to trigger a switch from a present mood state of the user;

determining a time taken by the user to provide the response to the challenge;

detecting a mood indicator representing switch to another mood state from the present mood state of the user;

determining a time taken to switch to the another mood state from the present mood of the user;

creating a mood signature comprising a unique transcript of mood indicators for the user, wherein the unique transcript is obtained based on the time taken by the user to provide the response to the challenge and the time taken to switch to the another mood state from the present mood of the user;

storing the mood signature in the electronic device; and validating an identity of the user comprising:

receiving a reference mood signature of the user, determining a degree of similarity between the reference mood signature and the stored mood signature of the user, and validating an identity of the user based on the degree of similarity between the reference mood signature and the stored mood signature of the user.

12. The method of claim 11, wherein the mood signature represents an intrinsic response of the user to a stimuli of data items presented to the user wherein the electronic device is one of virtual reality (VR) device, an Augmented Reality (AR) device, a mixed reality device, an IoT device.

13. The method of claim 11, wherein the graphical element comprises a plurality of data items dynamically arranged to form the challenge based on the present mood state of the user.

14. The method of claim 11, wherein the switch to another mood state from the present mood state of the user is detected when the mood indicator meets a mood switch threshold.

15. The method of claim 11, wherein the method further comprises performing by the mood signature manager at least one action in the electronic device based on the mood signature of the user, wherein the at least one action comprises at least one of selecting content to be displayed to the user, selecting a wallpaper for the user in the electronic device, selecting a theme for the user in the electronic device, and selecting a personalized recommendation for the user of the electronic device.

16. An electronic device for managing a mood signature of a user, the electronic device comprising:

a mood spectrum manager configured to obtain a mood spectrum comprising a plurality of mood indicators representing differential mood states of the user, a mood signature manager configured to create a mood signature comprising a unique transcript of the mood indicators for the user, based on the mood spectrum, wherein create the mood signature for the user based on the mood spectrum comprises:

determine an average time taken by the user to provide a response for each of the challenges based on the mood spectrum;

determine an average time taken to switch between each of the mood states of the user based on the mood spectrum; and create the mood signature comprising the unique transcript of mood indicators based on the average time taken by the user to provide a response for each of the challenges and the average time taken to switch between each of the mood states of the user; and a mood signature database configured to store the mood signature of the user.

17. The electronic device of claim 16, wherein the unique transcript is obtained based on a function of a time taken by the user to provide a response to a challenge presented to the user while obtaining each of the mood indicators and a time taken to switch between each of the mood states of the user.

18. The electronic device of claim 16, wherein the mood spectrum comprises a time taken by the user to provide a response to a challenge presented to the user while obtaining each of the mood indicators and a time taken to switch between each of the mood states of the user.

19. The electronic device of claim 18, wherein the switch between each of the mood states is determined by displaying a graphical element comprising a challenge eliciting a response from the user.

20. The electronic device of claim 19, wherein the graphical element comprises a plurality of data items dynamically arranged to form the challenge based on a present mood state of the user.

21. The electronic device of claim 16, wherein the mood signature representing an intrinsic response of the user to a stimuli of data items presented to the user, wherein the electronic device is one of virtual reality (VR) device, an Augmented Reality (AR) device, a mixed reality device, an IoT device.

22. The electronic device of claim 16, wherein obtaining the mood spectrum comprising the plurality of mood indicators comprises:

cause to display on a screen of the electronic device the graphical element eliciting a response to a challenge, wherein the graphical element comprises a plurality of data items dynamically arranged to form the challenge based on a first mood indicator, from the plurality of mood indicators, representing a present mood state of the user;

determine a time taken by the user to provide the response to the challenge;

detect a second mood indicator, from the plurality of mood indicators, representing a switch to another mood state from the present mood state of the user;

determine a time taken to switch to another mood state from the present mood state of the user; and obtain the mood spectrum describing the first mood indicator and the second mood indicator along with the corresponding time taken by the user to provide the response to the challenge and the corresponding time taken to switch to the another mood state from the present mood state of the user.

23. The electronic device of claim 22, wherein the switch to another mood state from the present mood state of the user is detected when the second mood indicator meets a mood switch threshold.

24. The electronic device of claim 16, wherein the mood signature manager is configured to perform at least one action in the electronic device based on the mood signature of the user, wherein the at least one action comprises validating an identity of the user, selecting content to be displayed to the user, selecting a wallpaper for the user in the electronic device, selecting a theme for the user in the electronic device, and selecting a personalized recommendation for the user of the electronic device.

25. The electronic device of claim 24, wherein validate identity of the user comprises:

receive a reference mood signature of the user;

determine a degree of similarity between the reference mood signature and the stored mood signature of the user; and validate the identity of the user based on the degree of similarity between the reference mood signature and the stored mood signature of the user.

26. An electronic device for managing a mood signature of a user, the electronic device comprising:

a mood signature database;

a processor; and a mood signature manager, coupled to the mood signature database and the processor, configured to:

cause to display a graphical element comprising a challenge eliciting a response from the user to trigger a switch to another mood from a present mood state of the user, determine a time taken by the user to provide the response to the challenge, detect a mood indicator representing switch to the another mood state from the present mood state of the user, determine a time taken to switch to the another mood state from the present mood of the user, create a mood signature for the user based on the time taken by the user to provide the response to the challenge and the time taken to switch to the another mood state from the current mood of the user, store the mood signature of the user in the mood signature database, and validate the identity of the user comprises:

receive a reference mood signature of the user, determine a degree of similarity between the reference mood signature and the stored mood signature of the user, and validate an identity of the user based on the degree of similarity between the reference mood signature and the stored mood signature of the user.

27. The electronic device of claim 26, wherein the mood signature comprises a unique transcript of mood indicators and is configured to represent an intrinsic response of the user to a stimuli of data items presented to the user, wherein the electronic device is one of virtual reality (VR) device, an Augmented Reality (AR) device, a mixed reality device, an IoT device.

28. The electronic device of claim 26, wherein the graphical element comprises a plurality of data items dynamically arranged to form the challenge based on the present mood state of the user.

29. The electronic device of claim 26, wherein the switch to another mood state from the present mood state of the user is detected when the mood indicator meets a mood switch threshold.

30. The electronic device of claim 26, wherein the mood signature manager is further configured to perform at least one action in the electronic device based on the mood signature of the user, wherein the at least one action comprises at least one of validate an identity of the user, select content to be displayed to the user, select a wallpaper for the user in the electronic device, select a theme for the user in the electronic device, and selecting a personalized recommendation for the user of the electronic device.

\* \* \* \* \*